United States Patent
Bassetti

(10) Patent No.: US 6,972,881 B1
(45) Date of Patent: Dec. 6, 2005

(54) MICRO-ELECTRO-MECHANICAL SWITCH (MEMS) DISPLAY PANEL WITH ON-GLASS COLUMN MULTIPLEXERS USING MEMS AS MUX ELEMENTS

(75) Inventor: Chester F. Bassetti, Danville, CA (US)

(73) Assignee: Nuelight Corp., Santa Clara, CA (US)

( * ) Notice: Subject to any disclaimer, the term of this patent is extended or adjusted under 35 U.S.C. 154(b) by 183 days.

(21) Appl. No.: 10/605,991

(22) Filed: Nov. 12, 2003

Related U.S. Application Data

(60) Provisional application No. 60/436,556, filed on Dec. 26, 2002, provisional application No. 60/428,200, filed on Nov. 21, 2002.

(51) Int. Cl.[7] .................. G02B 26/08; G02B 26/00; G09G 3/34
(52) U.S. Cl. .................. 359/198; 359/295; 345/85
(58) Field of Search .................. 359/198, 224, 359/291, 295, 315; 345/84, 85; 335/78, 79

(56) References Cited

U.S. PATENT DOCUMENTS

| | | | |
|---|---|---|---|
| 4,979,149 A | 12/1990 | Popovic et al. | 365/244 |
| 5,771,321 A | 6/1998 | Stern | 381/31 |
| 5,835,255 A | 11/1998 | Miles | 359/291 |
| 6,037,719 A | 3/2000 | Yap et al. | 315/169.3 |
| 6,091,386 A | 7/2000 | Bassetti et al. | 345/87 |
| 6,100,862 A | 8/2000 | Sullivan | 345/88 |
| 6,201,633 B1 | 3/2001 | Peeters et al. | 359/296 |
| 6,310,591 B1 | 10/2001 | Morgan et al. | 345/84 |
| 6,504,641 B2 | 1/2003 | Chan et al. | 359/254 |
| 6,519,013 B1 | 2/2003 | Nagai et al. | 349/33 |
| 6,741,384 B1 * | 5/2004 | Martin et al. | 359/291 |
| 6,900,851 B2 * | 5/2005 | Morrison et al. | 349/25 |
| 2001/0024186 A1 | 9/2001 | Kane et al. | 345/98 |
| 2001/0040538 A1 | 11/2001 | Quanrud | 345/55 |
| 2001/0043177 A1 | 11/2001 | Huston et al. | 345/87 |
| 2001/0045929 A1 | 11/2001 | Prache et al. | 345/89 |
| 2002/0000967 A1 | 1/2002 | Huston et al. | 345/88 |

(Continued)

OTHER PUBLICATIONS

Sarnoff Corp. Self-Scanned Amorphous Silicon Integrated Displays (SASID), web pages Nov. 11, 2003, pp1-3.

(Continued)

Primary Examiner—David Spector
Assistant Examiner—William Choi
(74) Attorney, Agent, or Firm—Stuart T. Auvinen

(57) ABSTRACT

A display has an array of Micro-Electro-Mechanical Switches (MEMS) display elements on a substrate such as glass. Rather than directly drive all columns of the MEMS display elements from off-substrate column drivers, column mux logic is placed on the substrate. The column mux logic uses MEMS contact-switch elements that have additional contact electrodes that touch and make electrical connection when the MEMS switch is closed, but do not touch and isolate the contact electrodes from each other when the MEMS switch is open. Smaller data words of column data is successively loaded into and stored by the MEMS column-mux, which then drives the columns of the display array. The smaller data words require fewer off-substrate connections than if all columns were driven by the off-substrate drivers. An intermediate holding voltage is applied to store column data in the column mux. Off-substrate interconnect is further reduced using on-substrate row-mux MEMS.

20 Claims, 14 Drawing Sheets

U.S. PATENT DOCUMENTS

| | | | |
|---|---|---|---|
| 2002/0000994 A1 | 1/2002 | Bergstrom et al. | 345/605 |
| 2002/0041264 A1 | 4/2002 | Quanrud | 345/55 |
| 2002/0101396 A1 | 8/2002 | Huston et al. | 345/87 |
| 2002/0126364 A1 | 9/2002 | Miles | 359/247 |
| 2002/0132389 A1 | 9/2002 | Patel et al. | 438/97 |
| 2002/0135595 A1 | 9/2002 | Morita et al. | 345/589 |
| 2002/0158820 A1 | 10/2002 | Hoppenbrouwers | 345/60 |
| 2002/0186108 A1 * | 12/2002 | Hallbjorner | 335/78 |
| 2002/0196389 A1 | 12/2002 | Koyama | 349/69 |
| 2002/0197761 A1 | 12/2002 | Patel et al. | 438/52 |
| 2003/0025656 A1 | 2/2003 | Kimura | 345/82 |

OTHER PUBLICATIONS

Sarnoff Corp. "SASID Technology", web pages Nov. 11, 2003, pp1-2.

* cited by examiner

R0= 0V(SELECT), C0= -2V(CLEAR), C1= -2V (CLEAR)

R0= 0V(SELECT), C0= -2V(CLEAR), C1= +6V (SET)

R0= +2V(DESELECT), C0= -2V(HOLD), C1= +6V (HOLD)

R0= 0V(SELECT), C0= -2V(CLEAR), C1= -2V (CLEAR)

| COL VOLTAGE (VC) | ROW VOLTAGE (VR) | VOLTAGE DIFFERENCE (VC-VR) | MEMS CELL ACTION |
| --- | --- | --- | --- |
| +6 | 0 | +6 | SET ON (TOGETHER, DARK) |
| -2 | 0 | -2 | CLEAR OFF (SEPARATED, LIT) |
| +6 | +2 | +4 | HOLD LAST STATE |
| -2 | +2 | -4 | HOLD LAST STATE |

FIG. 2   PRIOR ART

| COL VOLTAGE (VC) | ROW VOLTAGE (VR) | VOLTAGE DIFFERENCE (VC-VR) | MEMS SWITCH ACTION | DOUT=DIN? |
|---|---|---|---|---|
| +6 | 0 | +6 | SET ON (TOGETHER) | DOUT=DIN |
| -2 | 0 | -2 | CLEAR OFF (SEPARATED) | ISOLATED |
| +6 | +2 | +4 | HOLD LAST STATE | DOUT=DIN OR |
| -2 | +2 | -4 | HOLD LAST STATE | ISOLATED |

MICRO-ELECTRO-MECHANICAL SWITCH (MEMS) DISPLAY PANEL WITH ON-GLASS COLUMN MULTIPLEXERS USING MEMS AS MUX ELEMENTS

CROSS REFERENCE TO RELATED APPLICATIONS

This application claims the benefit of U.S. provisional applications for "High Resolution, High Color Display Achieving Lower Cost and Lower Power Consumption with Reduced Interconnect Requirements", U.S. Ser. No. 60/436,556, filed Dec. 26, 2002, and for "High Resolution, High Color Display Achieving Lower Cost and Lower Power Consumption with Reduced Interconnect Requirements", U.S. Ser. No. 60/428,200, filed Nov. 21, 2002.

BACKGROUND OF INVENTION

This invention relates to Micro-Electro-Mechanical Switches (MEMS), and more particularly to MEMS displays with column muxing on the display substrate using MEMS.

Flat-panel displays are rapidly displacing cathode-ray tube (CRT) displays as computer monitors. Small electronic devices including cell phones, personal digital assistants (PDAs), and music players have used flat-panel displays using liquid crystal display (LCD) technology.

Another flat-panel display technology uses nano-technology devices such as small switches with moving parts that are electronically activated to move. A physical spacing between plates can be adjusted to vary light reflection, transmission, or color of a pixel or sub-pixel. Such display devices may employ Micro-Electro-Mechanical Switches (MEMS).

A MEMS display may have an array of individual MEMS display elements arranged in hundreds of rows and columns. FIGS. 1A–D illustrate operation of 2 MEMS display elements. MEMS elements are fabricated on glass substrate 10, which can be a rigid silicon-dioxide or other type of glass, or may be a plastic or other kind of substrate. The viewer may see light transmitted through glass substrate that is altered by MEMS elements 20, 22 on the back surface of substrate 10. Additional layers and films may be added to substrate 10, such as to reduce glare.

Column electrodes 12, 14 are formed of conductive material on the lower surface of glass substrate 10. Electrical signals for column 0 are applied to column electrode 12, while different electrical signals for column 1 can be applied to column electrode 14. However, both MEMS elements 20, 22 are in the same row, and thus have row electrodes 16, 18 that are formed from the same conductive row material. A thin flexible metal or other conductive material may be used as the row material that includes row electrodes 16, 18. The flexible row material may be supported on glass substrate 10 by supporting structures and layers (not shown) that surround the moving row electrode portions of MEMS elements 20, 22.

Row electrodes 16, 18 of MEMS element 20, 22 can move in position relative to column electrodes 12, 14 and substrate 10 when certain electric fields are applied. In un-powered and low-voltage states, row electrodes 16, 18 are separated from column electrodes 12, 14 by a gap as shown in FIG. 1A. When a larger voltage difference is applied between the row and column electrodes of a MEMS element, electrical attraction pulls the row electrode closer to the column electrode, reducing the gap, such as shown for MEMS element 22 of FIG. 1B.

In FIG. 1A, row electrodes 16, 18 have 0 volts applied, while column electrodes 12, 14 have −2 volts applied. The voltage difference from column electrode 12 to row electrode 16 is −2 volts, which is too small of a voltage difference to attract and move row electrode 16 closer to column electrode 12. Thus MEMS elements 20, 22 remain in a cleared state.

In FIG. 1B, the row voltage is still 0 volts, which is the row-select voltage. However, column electrode 14 has +6 volts applied. The voltage difference from column electrode 14 to row electrode 18 is now +6 volts, which is a sufficiently high voltage to attract and move row electrode 18 closer to column electrode 14. The stronger electrical attraction at +6 volts is sufficiently strong to move row electrode 18 and reduce the gap between electrodes 14, 18 as shown. The +6 volts applied to column electrode 14 is thus a SET voltage since it sets MEMS element 22.

In FIG. 1C, the row is de-selected by raising the voltage of row electrodes 16, 18 from 0 to +2 volts. The voltage difference from column electrode 14 to row electrode 18 is reduced to (+6−+2=) 4 volts, while the voltage difference from column electrode 12 to row electrode 16 is increased to (−2−+2=) −4 volts. However, the 4-volt difference is not sufficient to move row electrodes 16, 18, but this absolute voltage difference of 4 volts is sufficient to hold the positions of row electrodes 16, 18. Thus when the row voltage is moved to the more intermediate voltage of +2 volts, MEMS elements 20, 22 remain in the last state since their voltage differences between row and column electrodes is not large enough to move their row electrodes.

The intermediate row voltage of +2 volts is known as a de-select voltage since the column voltages can change and not affect the position of the row electrodes. For example, the voltage of column 0 could change from −2 to +6 volts and the position of row electrode 16 would not change since absolute voltage differences of 4 volts are too small to move row electrode 16. Another row (not shown) in the display array could be selected and its MEMS elements set or cleared.

The distance D0 between column electrode 12 and row electrode 16 in MEMS element 20 in the CLEARed state is large enough to allow light to resonate within the gap and be reflected back from the gap between row electrode 16 and column electrode 12 through glass substrate 10. The wavelength or color of the reflected light can be adjusted by the distance D0 between electrodes, allowing some display elements with a larger D0 to display red while other MEMS elements with a smaller D0 display green or blue.

The distance D1 between column electrode 14 and row electrode 18 in MEMS element 22 in the SET state is too small to allow light to be reflected back through glass substrate 10. Instead, light is absorbed by the top surface of the row electrodes, which can be coated black. The distance D1 may be close to zero when row electrode 18 touches column electrode 14, such as when an insulating layer (not shown) is formed on either electrode. The viewer observes MEMS element 22 as being dark, while MEMS element 20 appears lit.

In FIG. 1D, the row is again selected by lowering its voltage from +2 to 0 volts. Column electrodes 12, 14 each have a clearing voltage of −2 volts applied. The voltage difference from column electrode 14 to row electrode 18 decreases to (−2−0=) −2 volts. The absolute voltage difference of 2 volts is not sufficient to keep row electrode 18 near column electrode 14, so row electrode 18 snaps back away from column electrode 14. MEMS element 22 is cleared and now appears lit to the viewer.

FIG. 2 is a table summarizing applied voltages and states of the display MEMS elements. When the row voltage is 0 volts, the row is selected and the MEMS elements can change state. When the row voltage is −2 volts the row is de-selected and the MEMS elements hold their prior state, either lit or dark.

When the row is selected (0 volts) and the column voltage is +6 volts, the voltage difference of 6 volts is large enough to generate attractive electrical forces to move the row electrode near the column electrode. The MEMS element is set. The reduced gap causes the MEMS element to appear dark.

When the row is selected (0 volts) and the column voltage is −2 volts, the voltage difference of −2 volts is too small to generate attractive electrical forces. Instead, elastic forces in the row electrode material or its supporting structures cause the row electrode to move away from the column electrode, to snap back into the separate state. The MEMS element is cleared. The large gap between electrodes causes the MEMS element to appear lit.

When the row is not selected (−2 volts) and the column voltage is +6 volts, the voltage difference of +4 volts generates an intermediate attractive electrical force. This intermediate force approximately balances the elastic forces in the row electrode material or its supporting structures. Since the forces are balanced, the row electrode does not move. The row electrode remains in its prior position, either separated or near the column electrode. This is a hold of the prior state.

When the row is not selected (−2 volts) and the column voltage is −2 volts, the voltage difference of −4 volts generates an intermediate attractive electrical force that approximately balances the elastic forces in the row electrode material. Since the forces are balanced, the row electrode does not move. The row electrode remains in its prior position, either separated or near the column electrode, and the prior state is held.

Such MEMS displays are useful and are becoming more popular as MEMS processing technology improves. However, a large number of row and column drivers may be needed to drive each of the rows and columns. Since each pixel may be sub-divided into MEMS elements for the three primary colors (R, G, B) and may be further subdivided for gray-scaling, the number of rows and columns can each be triple the number of display rows or columns. Routing signal traces from the row and column drivers to each row or column can be difficult as the size or pitch of the row and column drivers may be larger than the MEMS display elements.

What is desired is a MEMS display that uses fewer row and column drivers. A MEMS display that can be driven by a reduced number of row and column drivers is desired.

BRIEF DESCRIPTION OF DRAWINGS

FIG. 2 is a table summarizing applied voltages and states of the display MEMS elements.

DETAILED DESCRIPTION

The present invention relates to an improvement in MEMS displays. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that additional contact electrodes can be formed on a MEMS element. These additional contact electrodes can allow the MEMS element to function as a relay or switch. Since the MEMS elements can retain the prior state when the row voltage is driven to an intermediate, de-selected voltage, these MEMS elements can also act as storage elements, storing or retaining their prior state.

The inventor realizes that muxes can allow a reduced number of column drivers to drive a larger number of columns of MEMS display elements. The muxes can be constructed from MEMS elements that have the additional contact electrodes. Since the mux MEMS elements and the display MEMS elements are similar, they can be formed together on the same glass substrate. A reduced number of column pre-drivers off the substrate are then needed to drive the larger number of display columns since the MEMS-based muxes expand the number of columns driven.

Figure 1A:
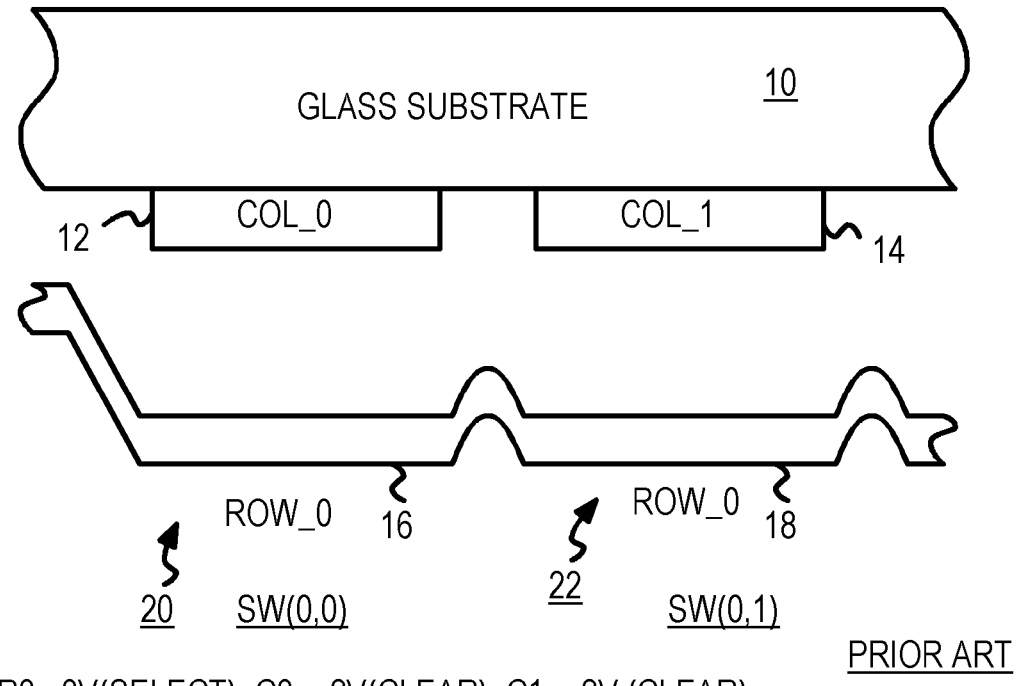
FIGS. 1A–D illustrate operation of 2 MEMS display elements.
Figure 1B:
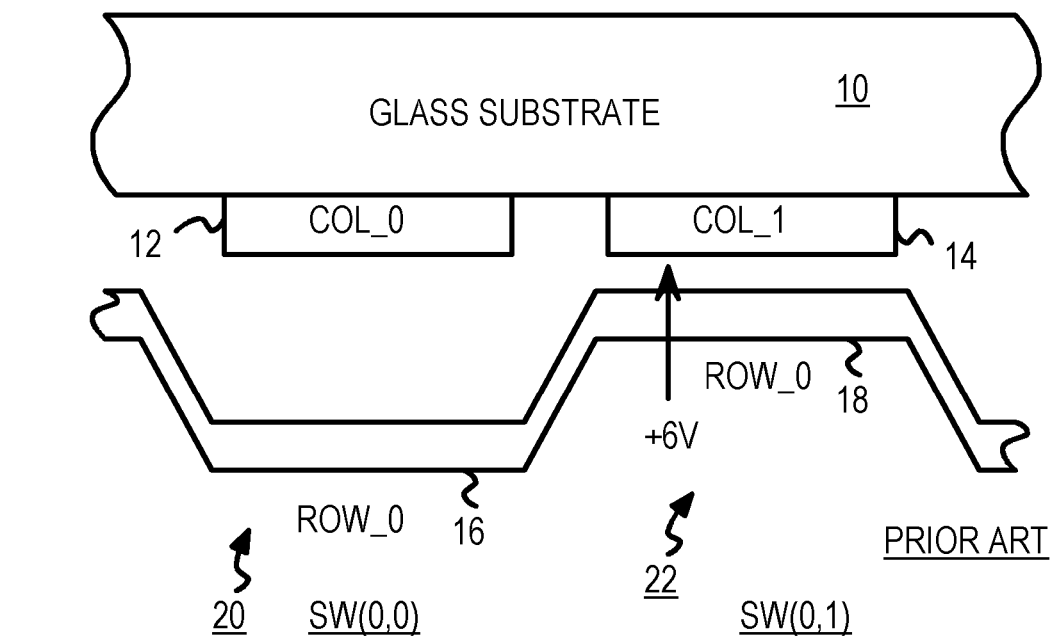
Figure 1C:
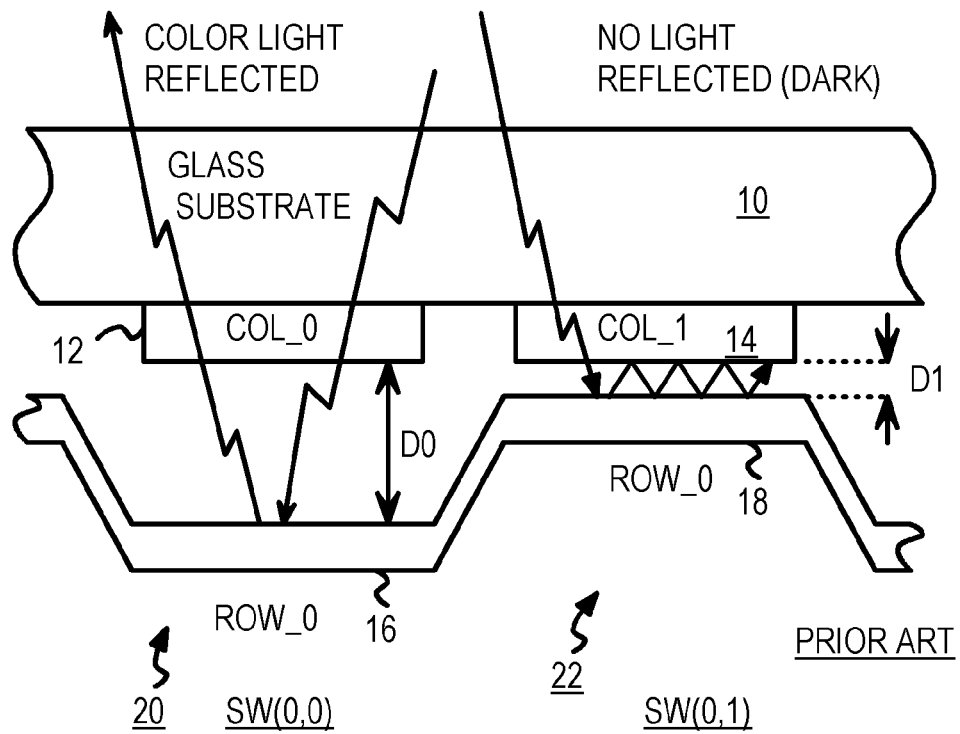
Figure 1D:
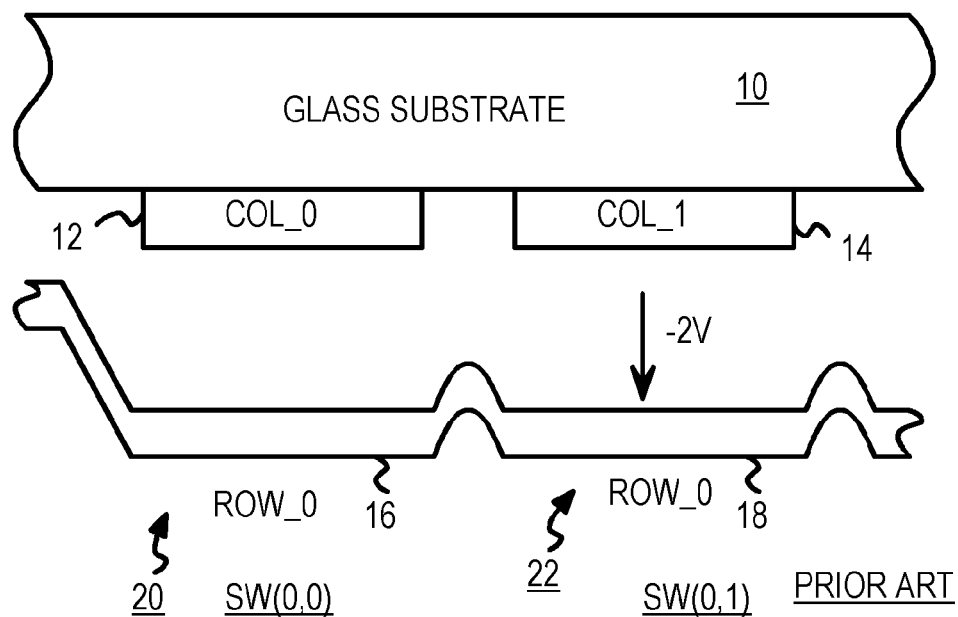
Figure 3A:
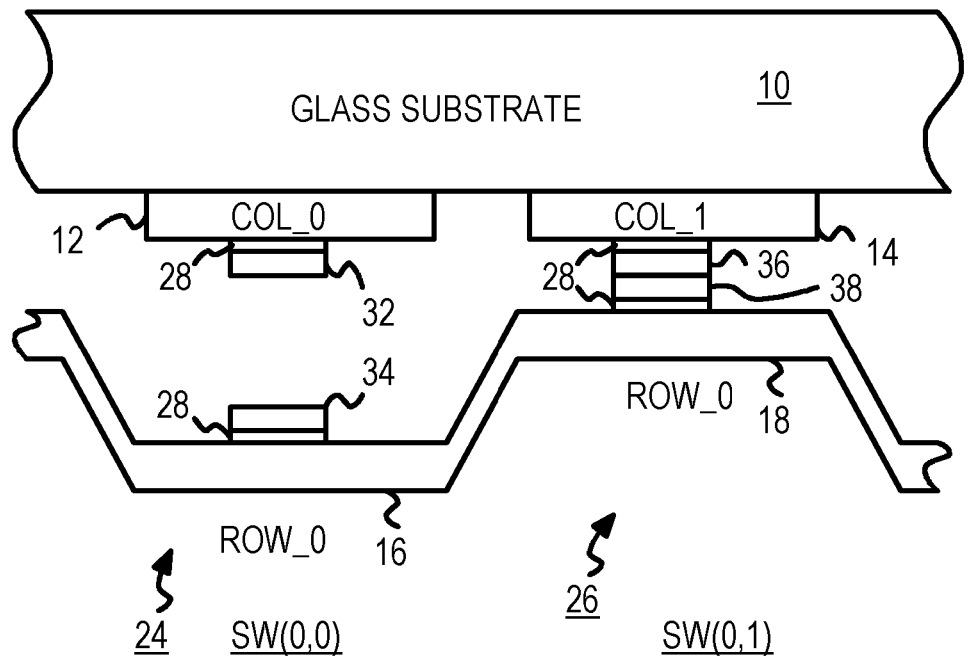
FIGS. 3A–D show MEMS switch elements with additional contact electrodes.

FIGS. 3A–D show MEMS switch elements with additional contact electrodes. In FIG. 3A, column electrodes 12, 14 are formed on the underside of glass substrate 10 while row electrodes 16, 18 are formed from a row material such as a flexible metal line that is supported by supporting structures (not shown) to substrate 10.

Additional processing steps are provided to form column contact electrodes 32, 36 and row contact electrodes 34, 38. Insulator layer 28 separates contact electrodes 32, 34, 36, 38 from row and column electrodes 12, 14, 16, 18. Insulator layer 28 isolates the contact electrodes from row and column electrodes. For example, insulator layer 28 allows column contact electrode 32 to carry a different electrical signal than column electrode 12.

Contact electrodes touch and make electrical connection when the MEMS switch is set, such as shown for MEMS switch 26. For example, when a large voltage difference is applied across row electrode 18 and column electrode 14, the attractive electrical force pulls row electrode 18 upward toward column electrode 14. Row contact electrode 38 touches and makes an electrical connection with column contact electrode 36 as shown. Insulator layer 28 keeps contact electrodes 36, 38 isolated from column electrode 14 and row electrode 18, allowing a separate signal to be carried by the contact electrodes.

The connection between contact electrodes is broken when the MEMS switch is cleared, such as shown for switch 24. A low voltage applied across column electrode 12 and row electrode 16 allows row electrode 16 to snap back away from column electrode 12, clearing MEMS switch 24. As the gap between electrodes 12, 16 increases, contact is broken between row contact electrode 34 and column contact electrode 32.

Figure 3B:
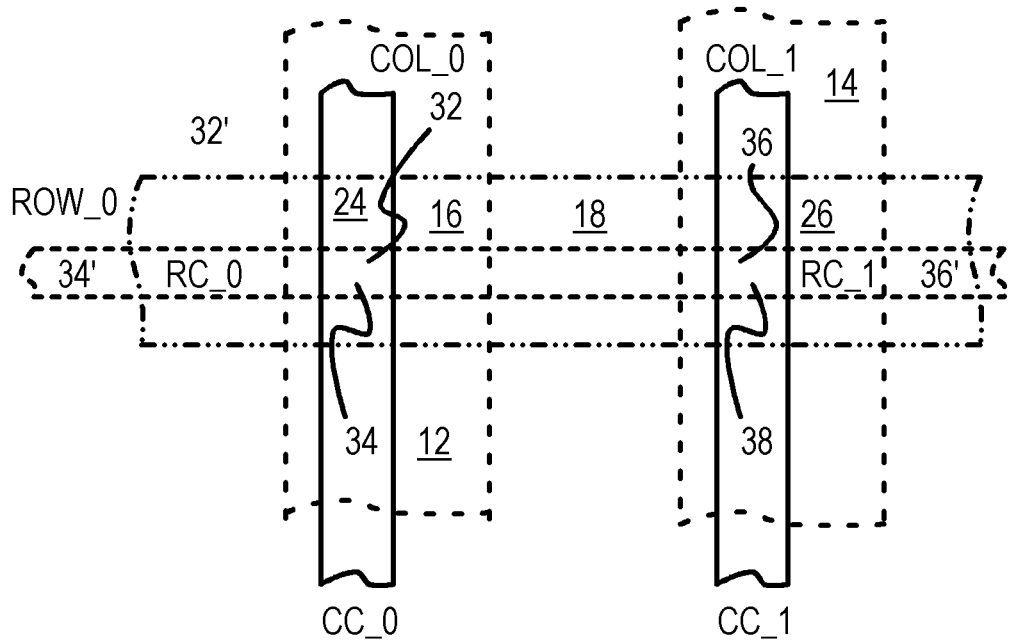

FIG. 3B is a layout view of two MEMS switches. MEMS switch 24 is formed where row material that includes row electrode 16 intersects column metal that includes column electrode 12. Likewise, MEMS switch 26 is formed where row material that includes row electrode 18 intersects column metal that includes column electrode 14. Many MEMS switches can be arrayed in many rows and columns.

Column contact electrode 32 can be connected to column contact trace 32', while row contact electrode 34 can be connected to a different wiring trace, row contact trace 34'. When MEMS switch 24 is cleared, column contact electrode 32 is separated from row contact electrode 34 and column contact trace 32' is electrically isolated from row contact trace 34'. However, when MEMS switch 24 is set, column contact electrode 32 touches row contact electrode 34 and column contact trace 32' is electrically connected to row contact trace 34'.

FIG. 3B shows a simplified, idealized layout. The actual shapes of lines and electrodes can be varied, such as by having notches, diagonal edges, bends, twists, etc. that are common in semiconductor memory cell layout. Adjacent lines within the switch array can be shared, such as shown for row contact traces 34', 36', or may be separate. A layer of insulating material (not shown) between row and column contact electrodes can have openings at each MEMS switch, such as at the intersection of column and row traces 32', 34', which form column and row contact electrodes 32, 34, 36, 38.

Figures 3C, 3D:
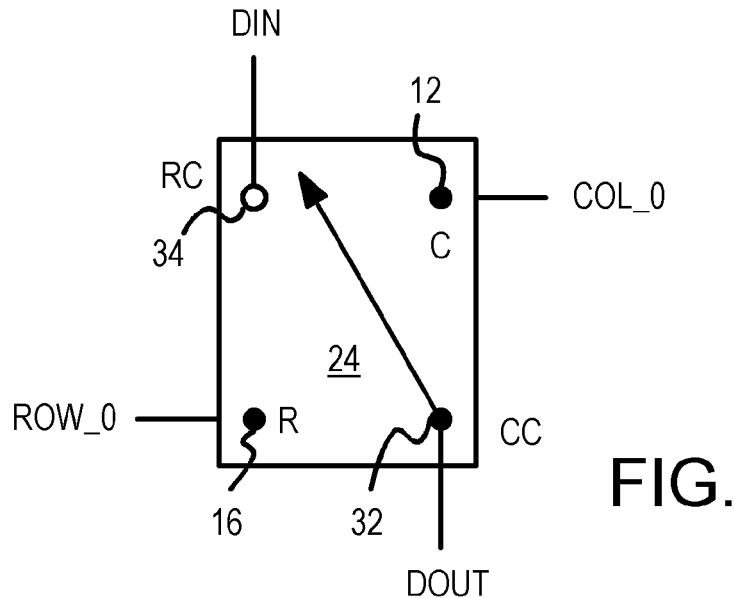

FIG. 3C shows an electrical symbol that represents one of the MEMS switch elements of FIGS. 3A–B. MEMS switch 24 is controlled by voltages applied to column electrode 12 and row electrode 16. For example, when MEMS switch is at position 0,0 in an array, row zero (ROW_0) is connected to row electrode 16 while column zero (COL_0) is applied to column electrode 12.

When the absolute value of the voltage difference between column electrode 12 and row electrode 16 is greater than an upper threshold (>6 volts), MEMS switch 24 is set, causing the row and column electrodes to move toward each other. This causes an electrical connection between row contact electrode 34 and column contact electrode 32, so that signal DIN applied to row contact electrode 34 is passed through column contact electrode 32 to signal DOUT.

When the absolute value of the voltage difference between column electrode 12 and row electrode 16 is less than a lower threshold (<2 volts), MEMS switch 24 is cleared, causing the row and column electrodes to move away each other. This causes an electrical dis-connection between row contact electrode 34 and column contact electrode 32, so that signal DIN applied to row contact electrode 34 is isolated from column contact electrode 32 and signal DOUT.

When the absolute value of the voltage difference between column electrode 12 and row electrode 16 is between the upper and lower thresholds (4 volts), MEMS switch 24 is held in the last state, either set or cleared. An electrical connection or disconnection remains as before between row contact electrode 34 and column contact electrode 32. The column and row voltages can change and not alter the state of MEMS switch 24 as long as the absolute voltage difference remains between the upper and lower thresholds.

Thus MEMS switch 24 acts as a voltage-controlled relay with a memory ability. The absolute voltage difference applied to column electrode 12 and row electrode 16 controls setting, clearing, or holding the switch. Connection or isolation between column contact electrode 32 and row contact electrode 34 depends on the state of MEMS switch 24. Otherwise column contact electrode 32 and row contact electrode 34 are isolated from column electrode 12 and from row electrode 16.

FIG. 3D is a table highlighting the possible states of the MEMS switch. When the row/column voltage difference is above the upper threshold, such as when the row is selected (0 volts) and the column voltage is +6 volts, the MEMS switch is set, closing contact between column contact electrode 32 and row contact electrode 34. The input data DIN connects to the output data DOUT.

When the row/column voltage difference is below the lower threshold, such as when the row is selected (0 volts) and the column voltage is −2 volts, the MEMS switch is cleared, opening the gap between column contact electrode 32 and row contact electrode 34. The input data DIN is isolated from the output data DOUT.

When +2 volts is applied to the row electrode, the row is deselected. The voltage difference of +4 or −4 is between the upper and lower thresholds, so the last state of the MEMS switch is held. The column voltages can change within their normal range of +6 to −2 volts since the intermediate row voltage prevents a large or small voltage difference from being generated.

Figure 4A:
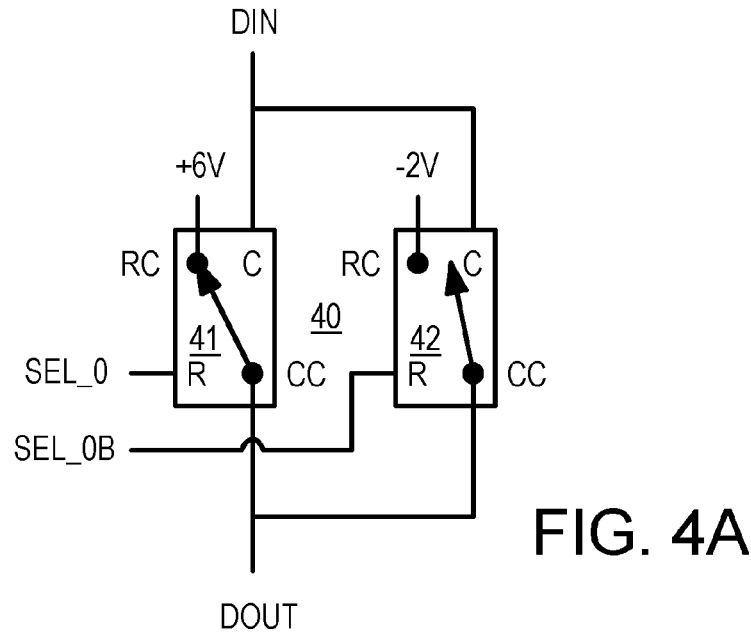
FIGS. 4A–B show a pair of MEMS switch elements being used as a MEMS storage mux for driving a column in an array of MEMS display elements.
Figure 4B:
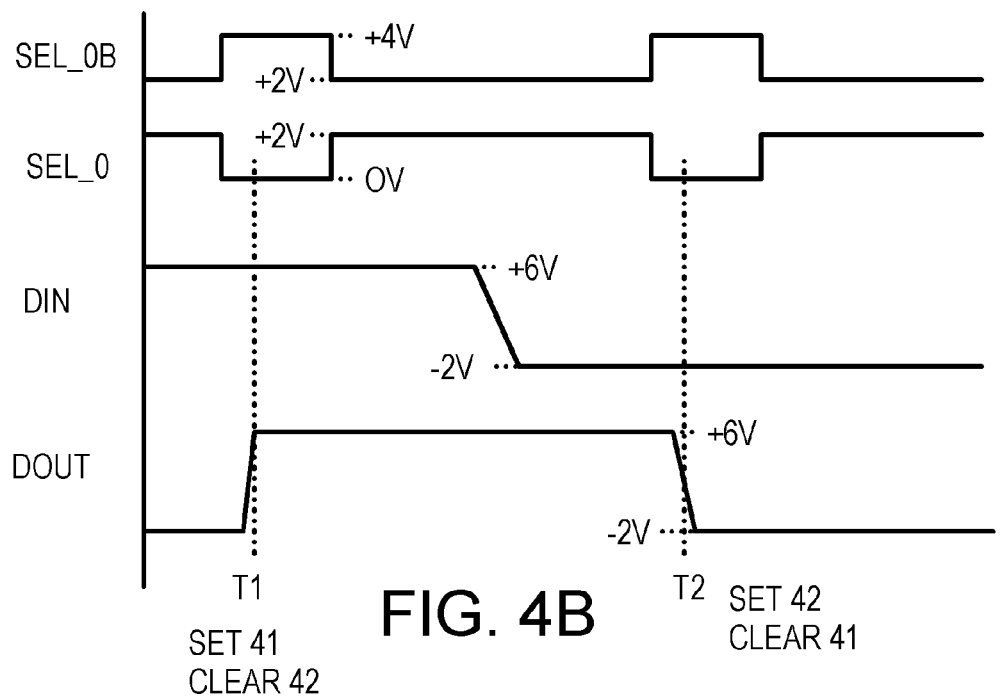

FIGS. 4A–B show a pair of MEMS switch elements being used as a MEMS storage mux for driving a column in an array of MEMS display elements. In FIG. 4A, MEMS switch elements 41, 42 are switch elements as described for MEMS switch 24 in FIGS. 3A–D. MEMS switch elements 41, 42 together form one-bit MEMS storage mux 40. The column electrodes of MEMS switch elements 41, 42 are connected together as input data DIN while the column contact electrodes of MEMS switch elements 41, 42 are connected together as data output DOUT.

Complementary row-select signals are applied as row-selects to the row electrodes of MEMS switch elements 41, 42. Row-select SEL_0 is applied to the row electrode of MEMS switch element 41, while row-select SEL_0B is applied to the row electrode of MEMS switch element 42. Both row selects SEL_0 and SEL_0B turn on at the same time, but are driven in opposite directions. These opposite row-select voltages cause the same input voltage DIN to set one of MEMS switch elements 41, 42 while clearing the other switch element. One of MEMS switch elements 41, 42 is set, connecting its contact electrodes together, while the other switch element is cleared, disconnecting its contact electrodes.

The row contact electrode of MEMS switch element 41 is connected to a fixed voltage of +6 v, while the row contact electrode of MEMS switch element 42 is connected to a different fixed voltage of −2 v. When MEMS switch element 41 is set but switch element 42 is cleared, the fixed +6 volts applied to the row contact electrode (RC) of switch 41 is connected to DOUT by contact with its column contact electrode (CC), but the fixed −2 volt from switch element 42 is disconnected from DOUT. Thus DOUT is +6 volts.

However, when MEMS switch element 41 is cleared but switch element 42 is set, the fixed −2 volts applied to the row contact electrode (RC) of switch 42 is connected to DOUT by contact with its column contact electrode (CC), but the fixed +6 volt from switch element 41 is disconnected from DOUT. DOUT is then −2 volts.

Thus the pair of MEMS switch elements 41, 42 drive DOUT to either +6 or −2 volts. Data output DOUT can be connected to column lines in the MEMS display array that have MEMS display elements such as shown and described in FIGS. 1–2.

FIG. 4B is a waveform showing operation of the MEMS storage mux of FIG. 4A. The complementary row-select signals SEL_0, SEL_0B are both de-selected when driven to +2 volts. During de-select periods, the MEMS switch elements 41, 42 hold their previous states.

Both complementary row-select signals SEL_0, SEL_0B are driven to select voltages at the same time. SEL_0 is pulsed low to 0 volts, while SEL_0B is pulsed high to +4 volts. At select time T1, when DIN is +6 volts, the row-column voltage difference for switch element 41 that receives SEL_0 (0 v) is (+6−0=) 6 volts, which is above the upper threshold, setting switch element 41. However the row-column voltage difference for switch element 42 that receives SEL_0B (4 v) is (+6−+4=) 2 volts, which is below the lower threshold, clearing switch element 42.

Since switch element 41 is set but switch element 42 is cleared at time T1, output data DOUT is driven to +6 v by the +6 v applied to the column contact electrode of switch element 41. This output state is held as SEL_0 and SEL_0B are de-selected (driven back to +2 v) even when the input data changes to −2 v.

Later, at select time T2, SEL_0 and SEL_0B are pulsed on again. Since DIN is now −2 volts, the row-column voltage difference for switch element 41 that receives SEL_0 (0 v) is (−2−0=)−2 volts, which is below the lower threshold, clearing switch element 41. However the row-column voltage difference for switch element 42 that receives SEL_0B (4 v) is (−2−+4=)−6 volts, which is above the upper threshold, setting switch element 42.

Since switch element 42 is set but switch element 41 is cleared at time T2, output data DOUT is driven to −2 v by the −2 v applied to the column contact electrode of switch element 42.

Figure 5:
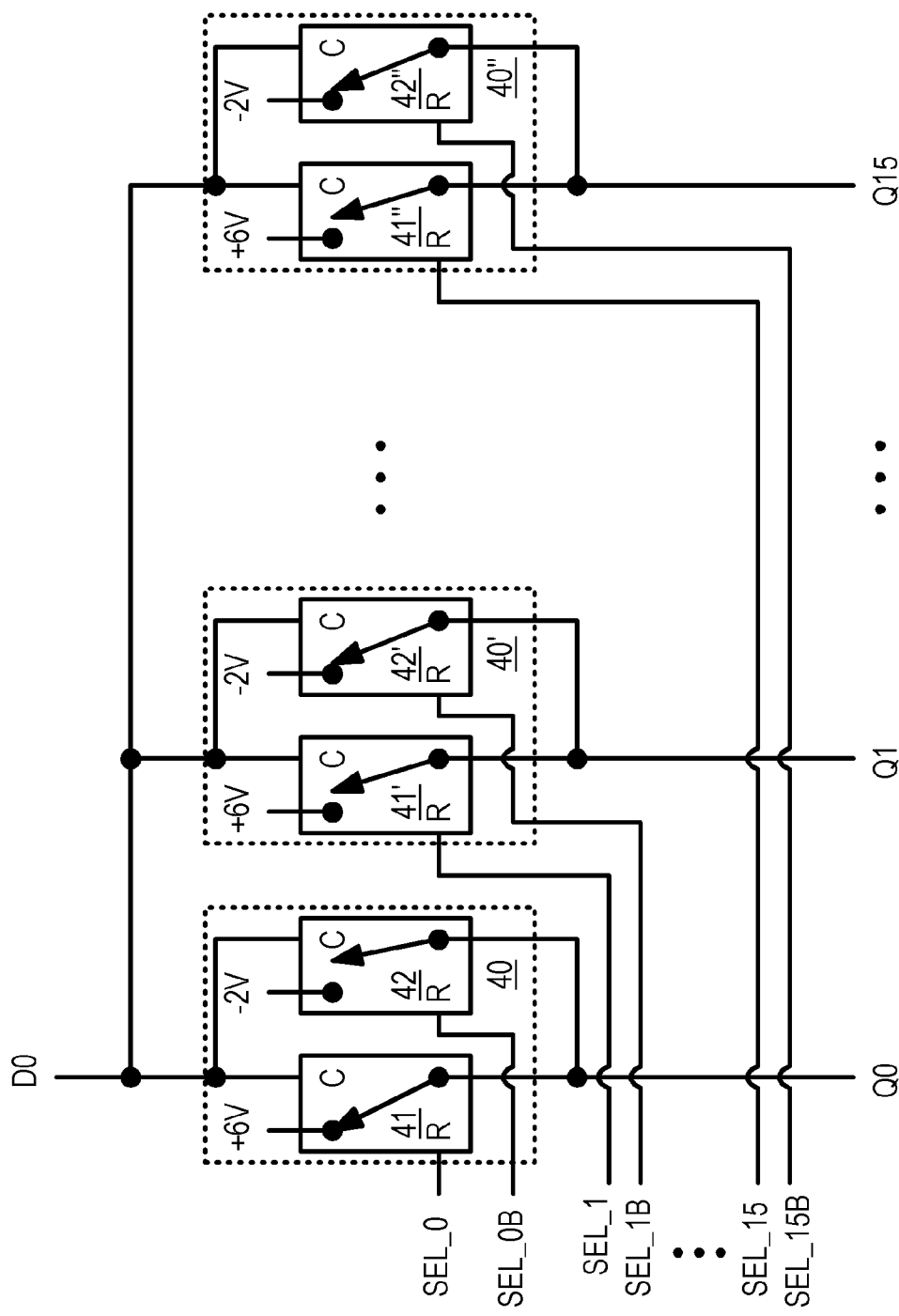
FIG. 5 shows a 1:16 mux constructed from MEMS storage muxes.

FIG. 5 shows a 1:16 mux constructed from MEMS storage muxes. Sixteen one-bit MEMS storage muxes 40, 40', . . . 40" are each connected to the same data input DIN at the column electrode input of MEMS switch elements 41, 42. All switch elements 41, 41', . . . 41" have row contact electrodes connected to a fixed +6 volts, while switch elements 42, 42, . . . 42" have row contact electrodes connected to a fixed −2 volts. Thus each one-bit MEMS storage mux 40, 40', . . . 40" can drive either +6 or −2 volts to its output Q0:15.

Each of the 16 one-bit MEMS storage muxes 40, 40', . . . 40" is driven by a different pair of complementary row-select lines, and each drives a different data output Q0:15. Normally only one pair of row-select lines is activated (selected) at a time while the other 15 pairs of row-select lines are not activated (de-selected).

In normal operation, each of the 16 one-bit MEMS storage muxes 40, 40', . . . 40" is loaded (set/cleared) while the others are de-selected. For example, DIN can be set to the data for column 0 that is driven to the display by Q0 , and then select lines SEL_0 and SEL_0B are activated (driven to 0, 4 volts, respectively) while the other select lines SEL_1:15 and SEL_1B:15B are de-selected (all driven to +2 volts). The first one-bit MEMS storage mux 40 is set by DIN and drives Q0. Then this state of DIN is stored by one-bit MEMS storage mux 40, which drives Q0 with +6 volts when DIN was high, or −2 volts when DIN was low.

The next one-bit MEMS storage mux 40' is then programmed by driving select lines SEL_1 and SEL_1B to 0, 4 volts, respectively, while the other select lines SEL_0, SEL_2:15 and SEL_0B, SEL_2B:15B are de-selected (all driven to +2 volts). The data for column 1 is driven onto DIN and loaded into one-bit MEMS storage mux 40'. Column 1 of the display is then driven to +6 or −2 volts by Q1 from one-bit MEMS storage mux 40'. Programming of the other one-bit MEMS storage muxes 40" can continue by activating a different pair of row-select lines until all 16 one-bit MEMS storage muxes 40, 40', 40" have been programmed.

The 16 one-bit MEMS storage mux 40, 40', . . . 40" drive 16 data-outputs Q0:15 that can be columns in a display MEMS array. Together, the 16 one-bit MEMS storage muxes 40, 40', . . . 40" form 1:16 MEMS storage mux 50. Arrays with more than 16 columns can be driven by using additional 1:16 MEMS storage muxes 50. Several such 1:16 MEMS storage muxes 50 can be programmed in parallel or in a sequence.

Figure 6:
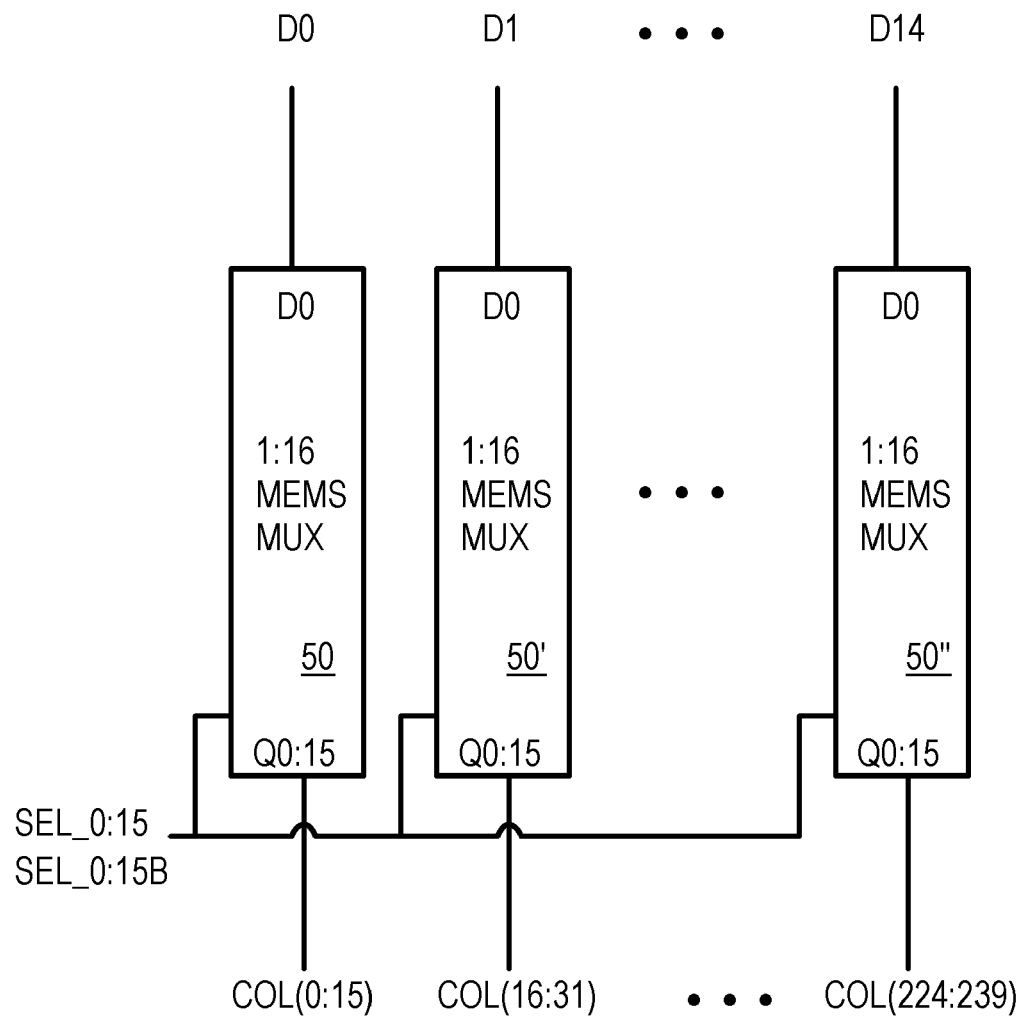
FIG. 6 shows MEMS muxes for driving a 240-column display.

FIG. 6 shows MEMS muxes for driving a 240-column display. Fifteen data inputs D0:15 are applied as a parallel data word at a time. Each data input line is connected to a different 1:16 MEMS storage mux 50, 50', . . . 50" and expanded by the mux to drive 16 columns of the display. For example, D0 is input to 1:16 MEMS storage mux 50 and drives columns 0 to 15 through mux outputs Q0:15. D1 is input to 1:16 MEMS storage mux 50' and drives columns 16 to 31 through mux outputs Q16:31.

The complementary row-select lines SEL_0:15 and SEL_0B:15B are applied to all 15 1:16 MEMS storage muxes 50, 50', . . . 50" in parallel. Thus the 15-bit input word D0:15 contains 15 separate bits that are programmed into each of the 15 1:16 MEMS storage muxes 50, 50, . . . 50" at the same time. A total of 16 different 15-bit data words can be applied in sequence and programmed into all the one-bit MEMS storage muxes to drive the 240 columns of the display. Column MEMS mux 52 contains a total of 15×16 or 240 one-bit MEMS storage muxes 40, 40', . . . 40", or twice as many (480) MEMS switch elements 41, 42 . . . 41", 42".

Figure 7:
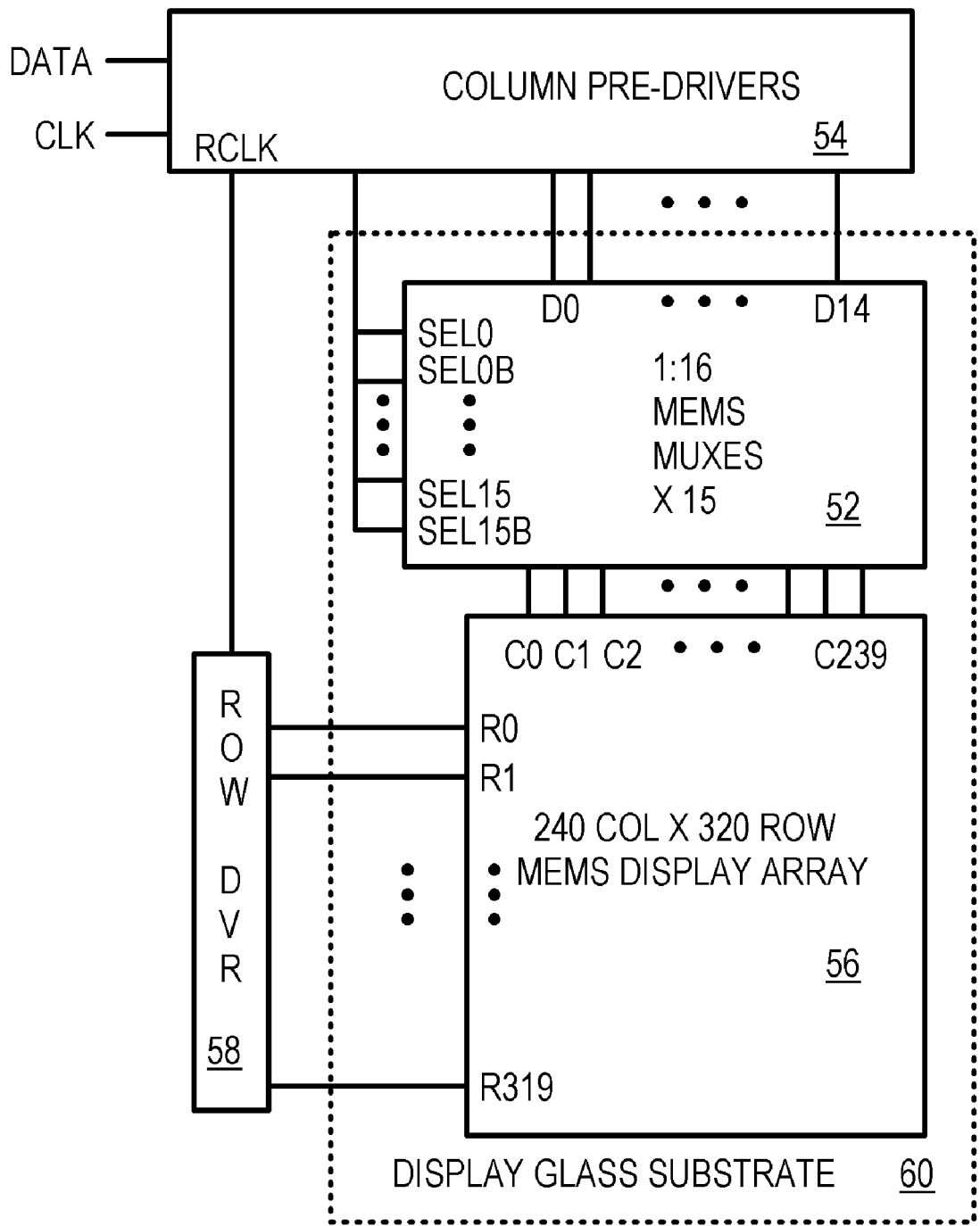
FIG. 7 shows a MEMS display with a column MEMS mux on the same glass substrate.

FIG. 7 shows a MEMS display with a column MEMS mux on the same glass substrate. Substrate 60 can be a clear glass substrate or some other substrate material such as a plastic sheet and can have multiple layers. MEMS elements are formed on a surface of substrate 60, such as on the underside. In particular, an array of MEMS display elements is formed as MEMS display array 56 on substrate 60. In this simple example MEMS display array 56 has 320 rows and 240 columns of mono-color display elements, but color displays could have three display elements (red, green, and blue) for each pixel location, or a total of 720 columns.

Also formed on substrate 60 is column MEMS mux 52. Column MEMS mux 52 is formed from MEMS switch elements that can be arrayed or can be in a looser pattern on substrate 60. Since the dimensions of MEMS display elements and MEMS switch elements are similar, matching column muxes to display columns is facilitated. Since both column MEMS mux 52 and the columns in MEMS display array 56 are on the same substrate 60, external wires between column MEMS mux 52 and MEMS display array 56 are avoided. Instead, relatively short metal traces on substrate 60 can connect column MEMS mux 52 to MEMS display array 56. A total of 240 such traces can drive the 240 columns of MEMS display array 56 from column MEMS mux 52.

The use of on-glass muxes significantly reduces the number of inputs to substrate 60. For example, rather than require 240 inputs from external column drivers 54 for each of the 240 columns, only a 15-bit data word D0:14 is driven onto substrate 60 from external column pre-drivers 54, along with 16 pairs of complementary row-select lines SEL_0:15, SEL_0B:15B. A total of 47 data/select inputs are needed from external column pre-drivers 54 to column MEMS mux 52 on substrate 60, rather than 240 column data inputs from external column pre-drivers 54 to substrate 60. This is a net reduction of 193 inputs, or about 80%. The size of connectors and cable or wires and from external column pre-drivers 54 to substrate 60 can be substantially reduced.

External column pre-drivers 54 can be a custom designed chip or a programmable-logic chip that receives graphics data words on a DATA input that are synchronized to an input clock CLK, and outputs the data in 15-bit words D0:14 to column MEMS mux 52. External column pre-drivers 54 also generates the complementary row-select signals SEL_0 . . . SEL_15B in sequence to load the 15-bit data words into column MEMS mux 52.

An entire row (line) of the display is loaded after 16 such 15-bit words are loaded into column MEMS mux 52 and driven to columns of MEMS display array 56. One of the rows R0:319 is activated by external row drivers 58 by driving a select voltage such as 0 volts onto the row, while the other 319 rows are de-selected by driving a de-select voltage such as +2 volts onto the de-selected rows. The display data from external column pre-drivers 54 is stored by MEMS switch elements in column MEMS mux 52 and then driven on the column lines to MEMS display elements in the selected row of MEMS display array 56. This display data is then stored in the selected row of MEMS display elements when the row line is de-selected until the next frame is refreshed.

The external column pre-drivers 54 can generate a pulse of the row clock RCLK to external row drivers 58. The row clock causes the next row R0:319 in MEMS display array 56 to be activated by external row drivers 58. Then external column pre-drivers 54 can load column MEMS mux 52 with another 16 15-bit words for the next row of display data, and the row-clock again pulsed. This process of loading rows of display data into column MEMS mux 52 is repeated until all rows have been loaded. Then external row drivers 58 loop back from last row R319 to first row R0 and the next frame of display data is refreshed to MEMS display array 56.

Figure 8:
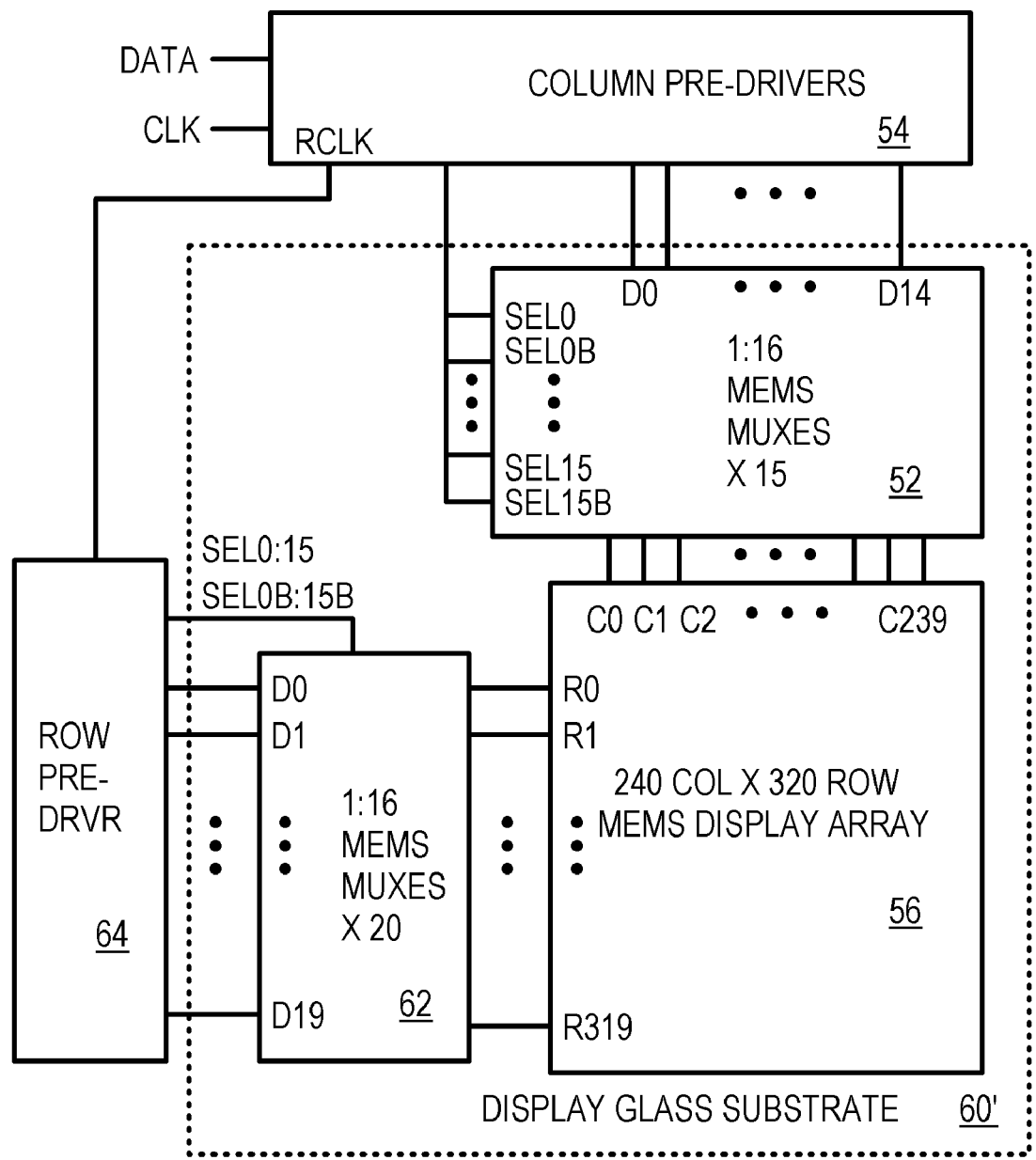
FIG. 8 shows a MEMS display with both column and row MEMS muxes on the display glass substrate.

FIG. 8 shows a MEMS display with both column and row MEMS muxes on the display glass substrate. External row drivers 58 in FIG. 7 required a cable and connectors for 320 row signals. MEMS muxing may also be provided on substrate 60' for the rows to further reduce off-substrate interconnect.

Substrate 60' contains MEMS display elements in MEMS display array 56, and MEMS switch elements in column MEMS mux 52 and in row MEMS mux 62. External column pre-drivers 54 receive display data and drive column MEMS mux 52 are described for FIG. 7. The row clock RCLK from external column pre-drivers 54 causes external row pre-drivers 64 to shift the selected row. However, rather than output all 320 row lines, external row pre-drivers 64 outputs only 20 data lines and 16 pairs of complementary select lines SEL_0 . . . SEL_15B to substrate 60'.

Row MEMS mux 62 is constructed in a similar manner to column MEMS mux 52, but has 20 1:16 MEMS storage muxes rather than just 15. Each time the row-clock pulses, a different row is selected, and external row pre-drivers 64 loads row MEMS mux 62 with new data. External row pre-drivers 64 can contain a ring pointer or shift register with all zeros except a one for the selected row. The zeros and one from this ring pointer are then output as the 20-bit data words D0:19 to row MEMS mux 62 on substrate 60' while external row pre-drivers 64 activates pairs of select lines SEL_0, SEL_0B, . . . SEL_15, SEL_15B in sequence to load the row data into row MEMS mux 62. Row MEMS mux 62 then drives the select voltage (0 volts) onto the one selected row to MEMS display array 56, while the other 319 non-selected rows are driven with the non-select voltage (+2 volts).

The off-substrate interconnect is significantly reduced using on-substrate row muxing. The number of external signals or wires for the rows is reduced from 320 in FIGS. 7 to 52 in FIG. 8. This is a net reduction of 268 external connections, or 84% of the rows. Using both column and row MEMS muxes on substrate 60' reduces the number of off-substrate interconnects by 193+268 or 461 external connections. This is a reduction of over 80% of the row and column interconnect. Of course, other signals must still be connected to substrate 60', such as +6 and −2 volt power supplies, etc.

More complex external row pre-drivers 64 could overwrite just the 20-bit data words D0:19 that change when the row clock pulses, rather than scan all 16 20-bit data words. Since only one row is selected at a time, most data words are all zeros and do not change. For example, first D0 is driven to the active state (+6 v) while D1–19 are driven to the inactive state (−2 v). Row 0 is driven to 0 v, row 0B is driven to +4 v. All other row selects are at +4 v, making all other row outputs select the 2 v fixed voltage while the first output goes to the active row condition of 0 v. On the next RCLK pulse, D0 remains in the same state (active +6 v) but row0 is driven back to the inactive state (along with keeping Rows 2–15 inactive and making row R1 active. This is done for all 16 rows. Then D0 is driven inactive, D(i) is activated. and the procedure is repeated.

Another possibility is to build a MEMS shift register on ubstrate 60' that is driven by RCLK could also be used for the rows rather than use row muxing. This could eliminate external row pre-drivers 64.

Figure 9A:
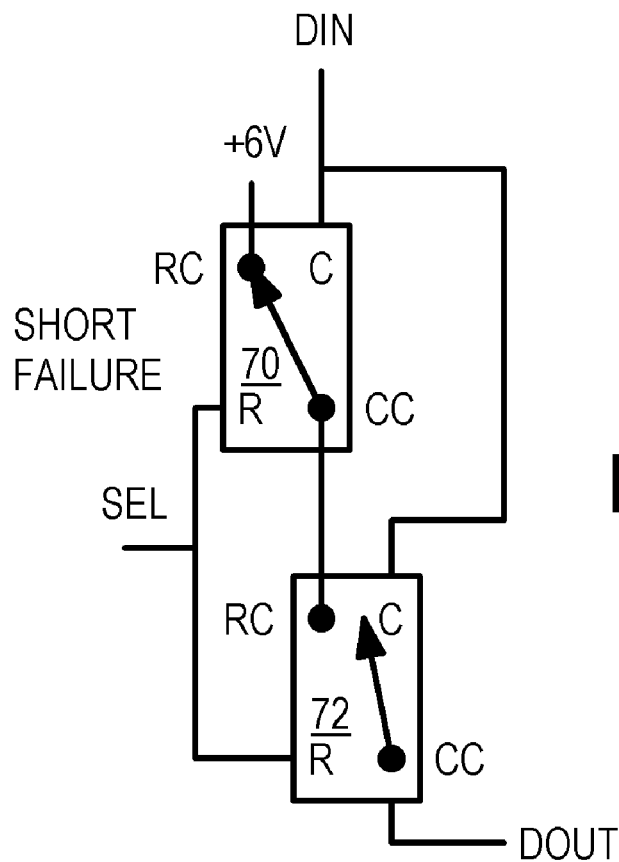
FIGS. 9A–C show redundant MEMS switch elements to increase manufacturing yield.
Figure 9B:
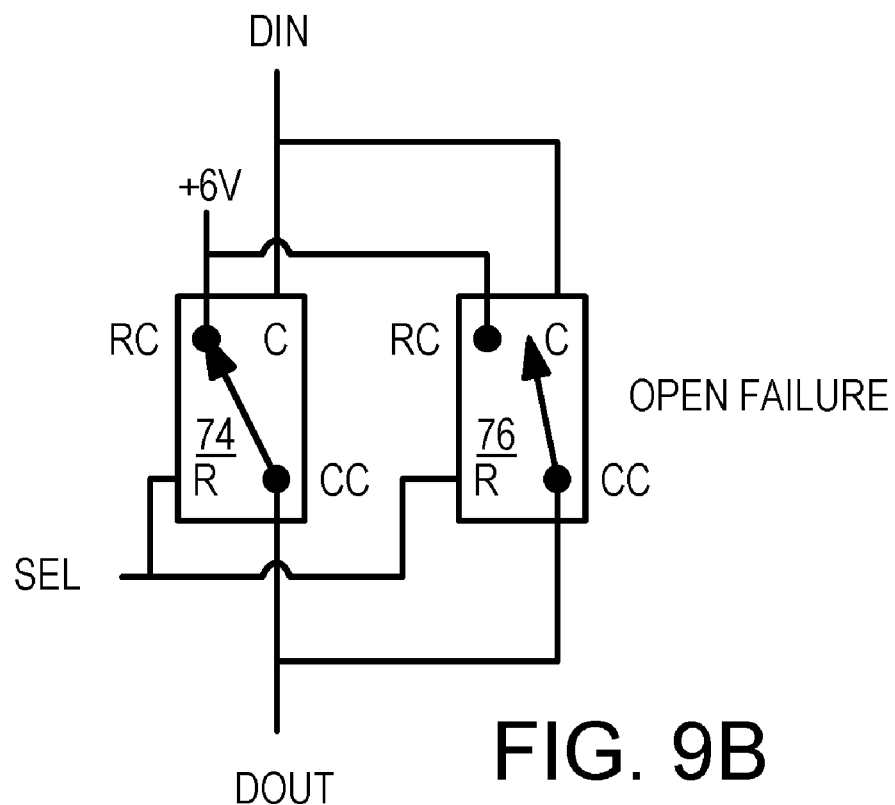
Figure 9C:
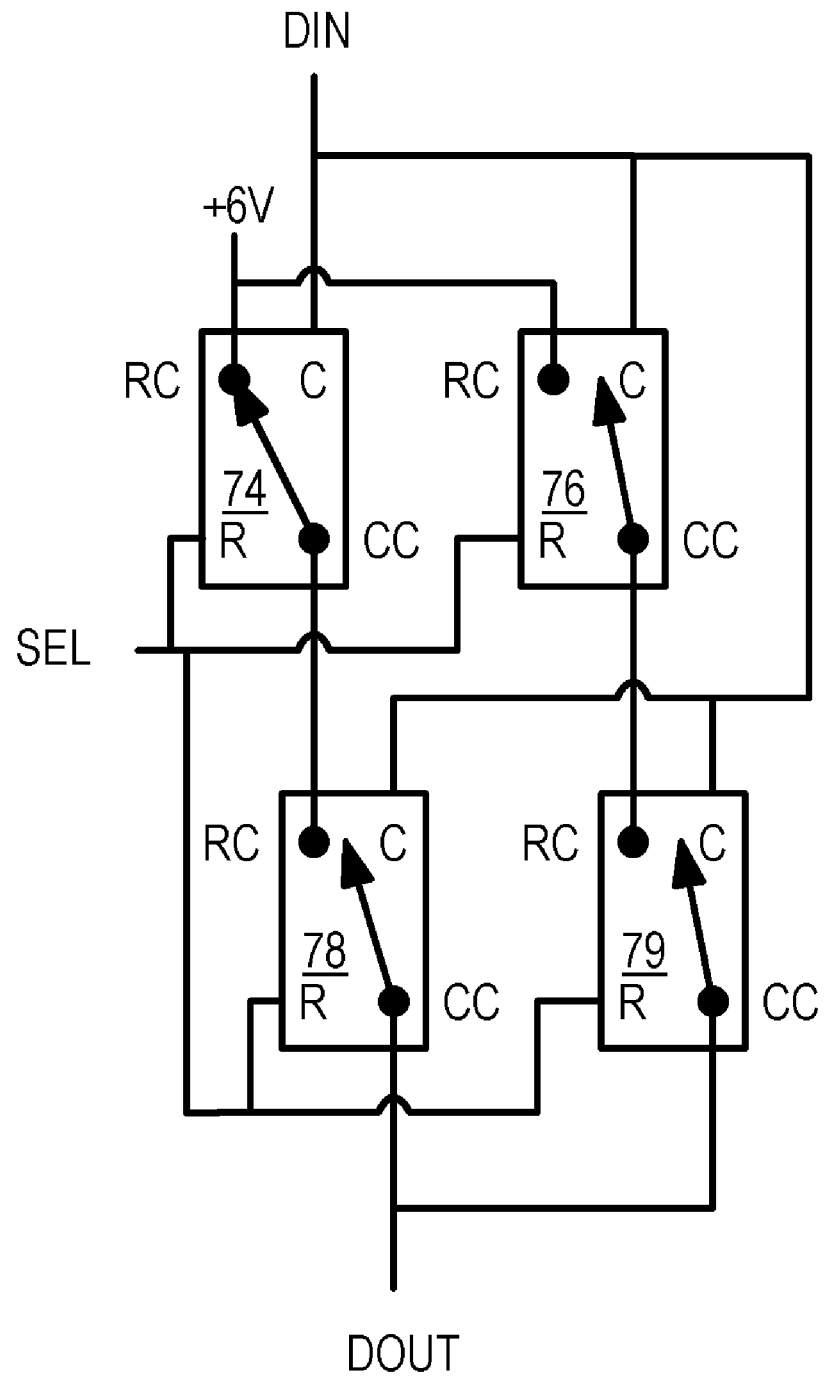

FIGS. 9A–C show redundant MEMS switch elements to increase manufacturing yield. Defects can occur during display manufacture that can cause a MEMS switch element to be open or short. Adding redundant MEMS switch elements can improve manufacturing yield, and as the size and cost of MEMS decreases, the additional cost of redundant element can be less than the cost benefit of an improvement in yield due to the redundant elements.

In FIG. 9A, MEMS switch elements 70, 71 are connected in series as a series redundancy. MEMS switch elements 70, 71 can together replace one MEMS switch element 41 (or 42) of FIGS. 4A, 5. The data input DIN connects to the column electrode of both switch elements 70, 71, while the select input SEL connects to both switches' row electrodes. Thus both MEMS switch elements 70, 71 should operate in the same manner, and be in the same state.

The contact electrodes are connected in series. The fixed voltage of +6 (or −2) volts is applied to the row contact electrode of element 70, while the column contact electrode of element 70 drives the row contact electrode of element 71. The column contact electrode of element 71 drives the output DOUT.

When switch elements 70, 71 are set or in the hold state after being set, the fixed +6 v passes between the contact electrodes of both switch elements 70, 71 to output DOUT. When switch elements 70, 71 are cleared or in the hold state after being cleared, the fixed +6 v is isolated from output DOUT since the contact electrodes don't touch.

When a manufacturing defect causes either of MEMS switch elements 70, 71 to be shorted, the row and column contact electrodes in the shorted switch element are always connected together. However, the other redundant switch element can still perform the intended function. For example, when switch element 70 is shorted, switch element 71 can still break the connection of the fixed +6 v voltage to DOUT, even though the +6 voltage is shorted between the row and column contact electrodes of switch element 70.

In FIG. 9B, MEMS switch elements 74, 76 are connected in parallel as a parallel redundancy. MEMS switch elements 74, 76 can together replace one MEMS switch element 41 (or 42) of FIGS. 4A, 5. The data input DIN connects to the column electrode of both switch elements 74, 76, while the select input SEL connects to both switches' row electrodes. Thus both MEMS switch elements 74, 76 should operate in the same manner, and be in the same state.

The contact electrodes are connected in parallel. The fixed voltage of +6 (or −2) volts is applied to the row contact electrode of both elements 74, 76, while the column contact electrodes of elements 74, 76 together drive the output DOUT.

When switch elements 74, 76 are set or in the hold state after being set, the fixed +6 v passes between the contact electrodes of either or both switch elements 74, 76 to output DOUT. When switch elements 74, 76 are cleared or in the hold state after being cleared, the fixed +6 v is isolated from output DOUT since the contact electrodes don't touch.

When a manufacturing defect causes either of MEMS switch elements 74, 76 to be open, the row and column contact electrodes in the open switch element are always dis-connected and can never connect. However, the other redundant switch element can still perform the intended function. For example, when switch element 76 is open, switch element 74 can still make the connection of the fixed +6 v voltage to DOUT, even though the +6 voltage is prevented from connecting between the row and column contact electrodes of open switch element 76.

In FIG. 9C, MEMS switch elements 74, 76, 78, 79 are connected in series and in parallel as a series-parallel redundancy. MEMS switch elements 74, 76, 78, 79 can together replace one MEMS switch element 41 (or 42) of FIGS. 4A, 5. The data input DIN connects to the column electrode of all four switch elements 74, 76, 78, 79 and the select input SEL connects to all four switches' row electrodes. Thus all four MEMS switch elements 74, 76, 78, 79 should operate in the same manner, and be in the same state.

The contact electrodes are connected in parallel for switch elements 74, 76, and again for switch elements 78, 79. The contact electrodes are also connected in series for switch elements 74, 78, and again for switch elements 76, 79.

The fixed voltage of +6 (or −2) volts is applied to the row contact electrode of both elements 74, 76, while the column contact electrodes of elements 78, 79 together drive the output DOUT.

When a manufacturing defect causes any one of the four MEMS switch elements 74, 76, 78, 79 to be open, the row and column contact electrodes in the open switch element are always dis-connected and can never connect. However, the other redundant parallel switch element can still perform the intended function. For example, when switch element 76 is open, switch element 74 can still make the connection of the fixed +6 v voltage to DOUT through switch element 78, even though the +6 voltage is prevented from connecting between the row and column contact electrodes of open switch element 76 through switch element 79.

When a manufacturing defect causes any one of the four MEMS switch elements 74, 76, 78, 79 to be shorted, the row and column contact electrodes in the shorted switch element are always connected together. However, the other series-redundant switch element can still perform the intended function. For example, when switch element 74 is shorted, switch element 78 can still break the connection of the fixed +6 v voltage to DOUT, even though the +6 voltage is shorted between the row and column contact electrodes of switch element 74. Likewise, if switch element 79 is shorted, switch element 76 can break the connection.

Figure 10:
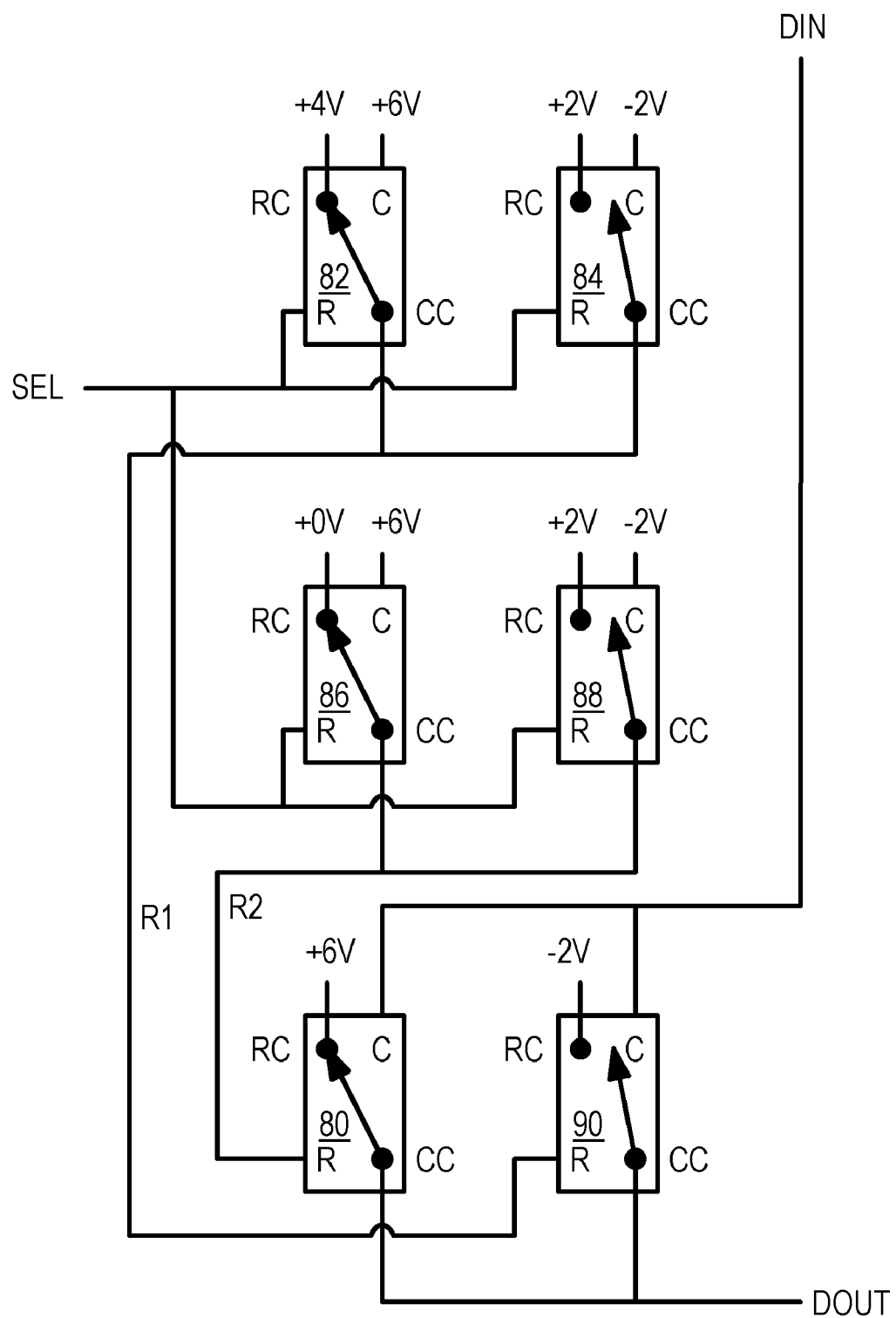
FIG. 10 is an alternative embodiment of the one-bit MEMS storage mux using only one select line rather than two complementary select lines.

FIG. 10 is an alternative embodiment of the one-bit MEMS storage mux using only one select line rather than two complementary select lines. Having a pair of complementary select lines may be undesirable in some cases. A single select line may be used when the two MEMS switch elements 41, 42 of FIGS. 4A, 5 are replaced with the six MEMS switch elements 82, 84, 86, 88, 80, 90 of FIG. 10.

MEMS switch elements 80, 90 perform the same function as MEMS switch elements 41, 42, but have internal-select lines R2, R1 driving their row electrodes, respectively, rather than the complementary row-select lines.

When SEL is active (0 volts), internal-select line R2 is driven to an activating select voltage of 0 volts by switch element 86. Also, internal-select line R1 is driven to an activating select voltage of +4 volts by switch element 82. Thus switch elements 80, 90 are driven with activating voltages of 0, +4 volts when SEL is active (0 volts).

When SEL is inactive (+4 volts), internal-select line R2 is driven to a de-select voltage of +2 volts by switch element 88. Also, internal-select line R1 is driven to a deselect voltage of +2 volts by switch element 84. Thus both switch elements 80, 90 are driven with a de-select voltage of +2 volts when SEL is inactive (−2 volts).

Figure 11:
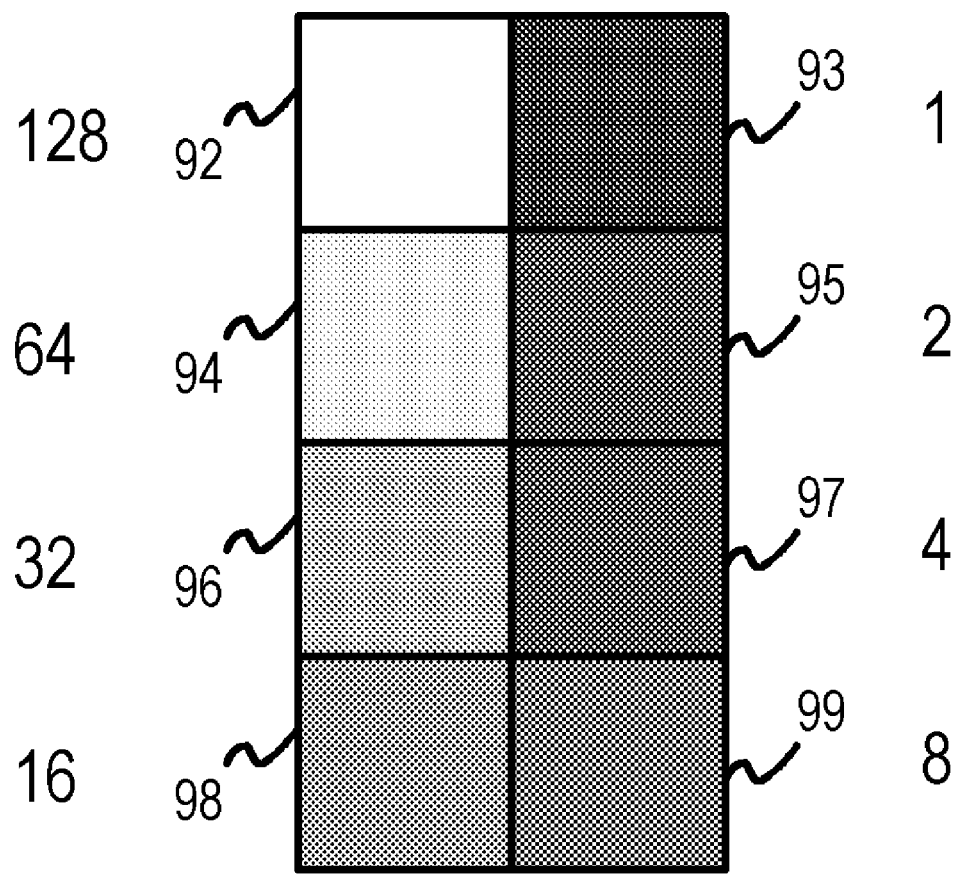
FIG. 11 highlights transparency-weighted gray-scaling for a MEMS sub-pixel.

FIG. 11 highlights transparency-weighted gray-scaling for a MEMS sub-pixel. Each pixel location in MEMS display array 56 (FIGS. 7, 8) can have more than one MEMS display element, and can have more than one row and one column. For example, a full-color display could have one red, one green, and one blue MEMS display element for the three sub-pixels. Additional MEMS display elements can be added for showing shades of each primary color, or shades of gray. Shading of colors can be referred to as gray-scaling even when the display is not a black-and-white display but is a color display. The gray-scaling techniques are simply applied to all three primary color sub-pixels.

Many methods and combinations of methods can be used for gray-scaling. For example, the time that a pixel is turned on and off can be adjusted relative to other pixels, so that pixels that are on for longer periods of time appear brighter. The rows select timing can be modulated to accomplish this gray-scaling.

Each sub-pixel can be further sub-divided into a group several MEMS display elements. The number of MEMS display elements in the group that are turned on determines the gray shade. More MEMS display elements are turned on for brighter shades while fewer MEMS display elements are turned on for darker shades. The size or area of the MEMS display elements in each sub-pixel group do not have to be equal. Larger-area MEMS display elements can be turned on for brighter shades than when smaller-area MEMS display elements are turned on.

Another gray-scaling technique is to vary the transmittance or transparency of the glass substrate over the MEMS display elements. This is known as transparency-weighted gray-scaling. Small black dots can be printed on the panel glass substrate in varying degrees of opacity. For example, in FIG. 11, a sub-pixel is further divided into 8 MEMS display elements that can be separately turned on and off. Display element 93 has a high density of dots printed over it and is the darkest shade. Display elements 98, 96 have a lower density of printed dots and thus have a higher transparency. Display element 92 has clear glass over it and is the brightest shade.

A large number of shades can be displayed from the 8 display elements 92–99. For example, a weighting of 72 (64+4+8) can be displayed by turning on display elements 94, 97, and 99 and turning off display elements 92, 93, 95, 96, 98. A total of $2^8$ or 256 shades can be displayed in this example. This is known as area weighting.

The number of rows and columns can increase significantly when such gray-scaling is used. For example, a mono-color display with 8 MEMS display elements per pixel location can have 2× the number of column and 4× the number of rows (or vice-versa). A color display with 3 primary sub-pixels has 3× the number of rows (or 3× the number columns). A color, 256-transparency gray-scale display could have 6× columns and 4×rows. As the number of rows and columns increases, the benefits of the invention are more compelling, since the rapid increase in row/column interconnect to the glass substrate from off-substrate row and column drivers is reduced substantially by about 80%. Thus the invention can enable such advanced gray-scaling and color shading that might otherwise not be feasible due to interconnect costs and complexity.

An advantage of transparency weighting occurs when the limit is reached on the smallest size of an individual display element. For example, 256 shades using 255 equally-sized and smallest-sized display elements might be too large to fit all of the elements into the given dimensions of a display size for some given resolution. The 8-equally sized but varying opacity cells would allow 256 shades with only 8-elements but have an overall reduction in maximum brightness compared with a display with no opacity limitations. The display of FIG. 11 display would be only 1+½+¼ . . . +¹⁄₁₂₈ or about 25% as bright as a similar display with all 8 cells at 100%., but, by combining the two techniques of area weighting and transparency weighting, a trade-off between brightness and the number of required display elements can be reached.

ALTERNATE EMBODIMENTS

Several other embodiments are contemplated by the inventor. For example. Different mux sizes (ratios) could be substituted for driving different display sizes and configurations. Nested muxes could also be used rather than one level of muxing. The data widths and arrangements of the MEMS muses can be adjusted to accommodate different display sizes and configurations. A 240 by 320 display has been shown as an example, but many other display sizes can be accommodated. For example, a 480-column display could be driven by 2 column MEMS mux 52 that each receive a 15-bit input-data word, or by using 1:32 muxes rather than 1:16 MEMS storage muxes. Row multiplexing rather than column multiplexing could be substituted, and the terms row and column could be interchanged as the display is rotated. The switching speed of the MEMS switch may determine how wide and how many muxes are used. If the switching speed is slow the muxing may be such that there are only modest improvements in the interconnection reduction. However, at high switching speeds the best improvements are realized.

Different voltages could be applied than the voltages used in the examples. Some MEMS elements may have different thresholds and thus require that different voltages be applied. Inversions of display visibility or signals may be used in some embodiments. MEMS elements can be constructed in a variety of ways and have many different physical shapes and dimensions and layouts and can have different appearances from the simplified examples used herein to teach the principles of the invention. The MEMS switches may be laid out in an alternating-row arrangement to reduce the column pitch of the muxes. Since a pair of MEMS switches are used for each column mux, the pair of MEMS switches could be laid out in the width of one column MEMS element by stacking the two MEMS switches of the mux. An insulating layer can prevent electrical contact between intersecting row and column contact electrodes where a MEMS switch is not desired. The +6 and −2 volt lines could be routed along the pair of rows for the mux. Row muxes could also be stacked, but horizontally to match the row pitch.

MEMS elements are fabricated on a glass substrate, which can be a rigid silicon-dioxide or other type of glass, or may be a plastic or other kind of substrate. The viewer may see light transmitted through glass substrate that is altered by MEMS display elements on the back surface of substrate 10, or may view light altered by MEMS elements on the front surface of substrate 10. Additional layers and films may be added to substrate 10, such as to reduce glare.

The MEMS display elements could have only two electrodes as shown, or could have the additional contact electrodes as do the MEMS switch elements. All MEMS elements could be manufactured with four electrodes, but the contact electrodes are not used or not connected for the display elements, although this may be impractical when the contact electrode block light.

Other techniques can be combined with the invention. For example, the display can be divided into two or more logical displays and a dual-scan technique used to refresh both half-displays at the same time, increasing the effective refresh rate and thus reducing flicker. Many gray-scaling techniques and combinations of techniques can be employed, especially for slow MEMS switching speeds.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A display with on-substrate muxing comprising:
   a display substrate;
   a display array of Micro-Electro-Mechanical Switches (MEMS) display elements for altering visible light, the MEMS display elements controlled by row and column signals, wherein each MEMS display element is controlled by a row electrode connected to a row signal and by a column electrode connected to a column signal;
   a column mux having MEMS contact-switch elements, the MEMS contact-switch elements having a pair of contact electrodes that is electrically connected together when the MEMS contact-switch element is closed, but the pair of contact electrodes is electrically isolated when the MEMS contact-switch element is open;
   wherein the column mux and the display array are formed on the display substrate, wherein the column signals to the display array are generated by the column mux;
   wherein the column signals are not driven by an off-substrate column driver but are driven by the column mux; and
   wherein an off-substrate interface to the column mux has fewer signals than a number of the column signals to the display array,
   whereby off-substrate interface signals for display columns are reduced using the column mux that is on the display substrate.

2. The display with on-substrate muxing of claim 1 wherein the off-substrate interface to the column mux includes a display data word of data to be displayed, the display data word having N bits of data;
   wherein the column mux drives a plurality of C column signals to the display array;
   wherein C is at least 8 times larger than N,
   wherein the column mux is at least a 1:8 mux wherein each bit of the display data word is multiplexed among at least 8 of the column signals to the display array.

3. The display with on-substrate muxing of claim 2 wherein the off-substrate interface to the column mux further includes select signals to control selection of the MEMS contact-switch elements in the column mux to receive and store the display data word.

4. The display with on-substrate muxing of claim 3 wherein the column mux comprises:
   a plurality of one-bit MEMS storage muxes that each have a first MEMS contact-switch element responsive to a first select signal applied to a control electrode and a second MEMS contact-switch element responsive to a complementary first select signal applied to a control electrode;
   wherein an applied bit of the display data word is applied to control electrodes of both the first and second MEMS contact-switch element;
   wherein a first fixed voltage is applied to a contact electrode of the first MEMS contact-switch element and is driven to a column signal when the applied bit is in a first state and the first select signal is activated;
   wherein a second fixed voltage is applied to a contact electrode of the second MEMS contact-switch element and is driven to the column signal when the applied bit is in a second state and the complementary first select signal is activated;
   wherein the column signal is driven with the first fixed voltage to close a MEMS display element in the display array after the applied bit is in the first state when the first select signal is activated;
   wherein the column signal is driven with the second fixed voltage to open a MEMS display element in the display array after the applied bit is in the second state when the complementary first select signal is activated.

5. The display with on-substrate muxing of claim 4 wherein the control electrodes control a state of the MEMS contact-switch element;
   wherein when an absolute voltage difference between control electrodes exceeds a first threshold the MEMS contact-switch element is in a set state and the contact electrodes are electrically connected;
   wherein when an absolute voltage difference between control electrodes is below a second threshold the MEMS contact-switch element is in a clear state and the contact electrodes are electrically isolated;
   wherein when an absolute voltage difference between control electrodes is between the first and second thresholds the MEMS contact-switch element is in a hold state wherein the contact electrodes are electrically connected when a prior state was the set state, and wherein the contact electrodes are electrically isolated when the prior state was the clear state.

6. The display with on-substrate muxing of claim 5 wherein the first and second MEMS contact-switch elements are in the hold state and hold the prior state when the first select signal and the complementary first select signal are driven to a holding voltage.

7. The display with on-substrate muxing of claim 6 wherein the column mux comprises:
   a plurality of C of the one-bit MEMS storage muxes;
   wherein each bit of the display data word is successively input to a plurality of C/N of the one-bit MEMS storage muxes that generate C/N of the column signals.

8. The display with on-substrate muxing of claim 7 wherein each one-bit MEMS storage mux further comprises redundant MEMS contact-switch element to allow for desired operation when a MEMS contact-switch element is faulty.

9. The display with on-substrate muxing of claim 1 further comprising:
   a row mux having MEMS contact-switch elements;
   wherein the row mux, the column mux, and the display array are formed on the display substrate, wherein the row signals to the display array are generated by the row mux;
   wherein the row signals are not driven by an off-substrate row driver but are driven by the row mux; and
   wherein an off-substrate interface to the row mux has fewer signals than a number of the row signals to the display array,
   whereby off-substrate interface signals for display rows are reduced using the row mux that is on the display substrate.

10. A reduced-interconnect display comprising:
    a display array of Micro-Electro-Mechanical Switch (MEMS) display elements controlled by row signals and column signals, each MEMS display element having a column electrode connected to a column signal and a row electrode connected to a row signal, wherein a gap between the row and column electrodes is a reduced gap when an absolute voltage difference between the row signal and the column signal exceeds a set threshold, and wherein the gap between the row and column electrodes is a enlarged gap when the absolute voltage difference between the row signal and the column signal is below a clear threshold, and wherein the gap between the row and column electrodes is unchanged change when the absolute voltage difference between the row signal and the column signal is between the set threshold and the clear threshold;

wherein visible light from the MEMS display element is altered when the gap changes between the reduced gap and the enlarged gap;

a mux array of Micro-Electro-Mechanical Switch (MEMS) switch elements each having a first control electrode, a second control electrode, a first contact electrode, and a second contact electrode, wherein (1) when an absolute voltage difference between the first control electrode and the second control electrode exceeds the set threshold the first contact electrode and second contact electrode are electrically connected together; (2) when the absolute voltage difference between the first control electrode and the second control electrode is below the clear threshold the first contact electrode and second contact electrode are electrically isolated from each other; and (3) when the absolute voltage difference between the first control electrode and the second control electrode is between the set threshold and the clear threshold the first contact electrode and second contact electrode remain in a prior state;

wherein the mux array receives mux-select signals and display-data input signals that successively receive display data words and generates the column signals to the display array, and a display substrate for supporting the display array of the MEMS display elements and the mux array of the MEMS switch elements, the display substrate being an integral part of the MEMS display elements and the MEMS switch elements;

wherein the column signals are directly driven by the mux array to the display array, reducing a number of signals for an off-substrate column interface.

11. The reduced-interconnect display of claim 10 wherein the off-substrate column interface comprises the display-data input signals that receive a display data word of N bits and a plurality of the mux-select signals to control the mux array;

wherein the display array has C column signals, wherein C and N are positive whole numbers and C is greater than N and C is a whole-number multiple of N;

wherein the mux array comprises a plurality of bit-muxes, each bit-mux receiving one of the N bits of the display data word and driving C/N column signals to the display array;

wherein each bit-mux receives all signals in the plurality of mux-select signals.

12. The reduced-interconnect display of claim 11 wherein each bit-mux comprises:

a plurality of C/N one-bit MEMS storage mux cells, each one-bit MEMS storage mux cell receiving one of the N bits of the display data word as a data input, and driving one column signal to the display array in response to a mux-select signal in the plurality of mux-select signals.

13. The reduced-interconnect display of claim 12 wherein each one-bit MEMS storage mux cell comprises:

a first MEMS switch element having a first control electrode receiving a mux-select signal, a second control electrode receiving a data input, a first contact electrode connected to a first fixed voltage, and a second contact electrode connected to drive the column signal; and a second MEMS switch element having a first control electrode receiving a complementary mux-select signal, a second control electrode receiving the data input, a first contact electrode connected to a second fixed voltage, and a second contact electrode connected to drive the column signal.

14. The reduced-interconnect display of claim 13 wherein the one-bit MEMS storage mux cell is activated by driving the mux-select signal to a first select voltage and driving the complementary mux-select signal to a second select voltage;

wherein the one-bit MEMS storage mux cell is deactivated and holds a prior state by driving the mux-select signal and the complementary mux-select signal to a de-select voltage that is between the first select voltage and the second select voltage.

15. The reduced-interconnect display of claim 13 wherein the column signal is driven with the first fixed voltage by the one-bit MEMS storage mux cell to switch a selected MEMS display element to the reduced gap when the data input is in a first state and the one-bit MEMS storage mux cell is activated;

wherein the column signal is driven with the second fixed voltage to switch the selected MEMS display element to the enlarged gap when the data input is in a second state and the one-bit MEMS storage mux cell is activated;

wherein the selected MEMS display element is in a selected row that has a row-selection voltage applied to the row signal for the selected row.

16. The reduced-interconnect display of claim 10 further comprising:

a second mux array of the MEMS switch elements, the second mux array receiving row mux-select signals and row display-data-input signals, the second mux array for generating the row signals to the display array, wherein the second mux array is an integral part of the display substrate;

wherein the row signals are directly driven by the second mux array to the display array, reducing a number of signals for an off-substrate row interface.

17. The reduced-interconnect display of claim 16 further comprising:

a column pre-driver device, receiving a graphics clock and a stream of display data for display by the display array, for generating a row clock, the mux-select signals, and successive display data words transferred to the display substrate by the display-data input signals;

a row pre-driver device that receives the row clock from the column pre-driver device, the row pre-driver device generating the row mux-select signals and the row display-data-input signals to the second mux array;

wherein the column pre-driver device and the row pre-driver device are not on the display substrate.

18. A Micro-Electro-Mechanical Switches (MEMS) display comprising:

substrate means for supporting MEMS elements and conductive traces;

display means for altering light to generate a visible image, the display means having rows and columns of MEMS display means for altering a visible pixel by moving electrodes in response to an absolute voltage difference across the electrodes;

multiplexer means, on the substrate means and coupled to the display means by column traces, for storing successively received display data words to drive all column traces to the display means;

wherein the multiplexer means further comprises a plurality of bit-mux means for receiving one bit of the display data word and for driving multiple column traces from successive display data received;

wherein the bit-mux means comprises a plurality of one-bit MEMS storage mux means for storing the one bit of the data word and driving one column trace; and wherein each one-bit MEMS storage mux means comprises a plurality of MEMS switch means for electrically connecting a first contact electrode to a second contact electrode when an absolute voltage difference between a first electrode and a second electrode exceeds a set threshold, and for electrically isolating the first contact electrode from the second contact electrode when the absolute voltage difference between the first electrode and the second electrode is below a clear threshold, and for maintaining a prior connection or isolation state when the absolute voltage difference between the first electrode and the second electrode is above the clear threshold and below the set threshold, whereby muxing of the display data word is performed on the substrate means by the MEMS switch means.

19. The MEMS display of claim 18 wherein each one-bit MEMS storage mux means comprises two MEMS switch means including:

a first MEMS switch means for driving a set voltage onto the column trace to set a MEMS display means in a selected row when the one bit of the display data word received is in a first state;

a second MEMS switch means for driving a clear voltage onto the column trace to clear the MEMS display means in the selected row when the one bit of the display data word received is in a second state.

20. The MEMS display of claim 18 further comprising:

transparency-weighted shading means, on the substrate means, for displaying shades of color by absorbing different amounts of light reflected from different MEMS display means, the transparency-weighted shading means having differing transparencies formed on the substrate means over different MEMS display means.

* * * * *